UNITED STATES PATENT OFFICE.

ALADÁR von LASZLOFFY, OF PEORIA, ILLINOIS.

PROCESS OF OBTAINING BY-PRODUCTS FROM DISTILLERY-SLOP.

1,147,768.  Specification of Letters Patent.  Patented July 27, 1915.

No Drawing. Original application filed January 30, 1911, Serial No. 605,611. Divided and this application filed August 25, 1911. Serial No. 645,912.

*To all whom it may concern:*

Be it known that I, ALADÁR VON LASZLOFFY, citizen of the United States, residing at Peoria, in the county of Peoria and State of Illinois, have invented certain new and useful Improvements in Processes of Obtaining By-Products from Distillery-Slop; and I do hereby declare that the following is a full, clear, and exact description of the invention, which will enable others skilled in the art to which it appertains to make and use the same.

This invention relates to a new and useful process for the manufacture of by-products from slops.

The object of the invention is to recover from distillery-slop a plurality of by-products such as lactic acid, succinic acid, fat, and other materials resident therein by the aid of solvents.

In my co-pending patent application, No. 605,611 filed January 30, 1911, of which this application is a divisional one, I have described a method of separating a mixture of organic acids, fat and glycerin from distillery-slop by treating slop with alcohols or mixtures of alcohols with ethyl-ether, chloroform, tetrachlorid of carbon or other such mixtures in which alcohol predominates. By this treatment a mixture of by-products of different character, but all soluble in the same solvent, is obtained and this mixture is afterward separated into the individual products making up such mixture. One of the methods of separation described in said application is that of treating the mixture of by-products with such solvents as will dissolve lactic and succinic acids, and fat, but will have a tendency to repel glycerin.

The recovery of lactic acid, succinic acid and fat directly from distillery-slop or preparations of distillery-slop, by treating it with such solvents as dissolve said products and have a tendency to repel glycerin is the object of the present process.

By preparations of distillery-slop I mean the various forms into which distillery slop may be brought by filtering, evaporating, drying or by any other means.

I use in the present process, as already mentioned, a solvent that dissolves fat and the organic acids of the slop but which does not mix with glycerin. For instance, such a solvent may be ether, chloroform, benzol, benzin, other hydrocarbons, the chlorderivates of hydrocarbons or mixtures of them having this property to some degree and it may be stated that the greater the affinity the solvent has for water the quicker it will extract the organic acids, but the less pure will be the products.

In the claims I shall refer to these solvents under the generic term of "fat-solvents" referring to such fat-solvents as have just been enumerated, or others such as do not mix with glycerin, their mixtures, or mixtures of the same with a small amount of other substances, as I have found that all fat-solvents or their mixtures have, to a certain degree at least, the property of dissolving the organic acid present in the slop and that the differences of their action in that respect is, therefore, only a difference of degree. I use, preferably, however, ethyl-ether which dissolves the lactic and succinic acids sufficiently rapid and still gives products of high purity at the same time, leaving the residue in the best condition as a feed.

I have so far explained the principle of my invention and will now describe the other steps of my process wherein the preparatory treatment of the slop takes place before the various steps of extraction.

In my said co-pending patent application I have given a detailed description of the manner in which the slop is prepared for the solvent-treatment. I can and do use all of the preparatory steps described therein with equal advantage in the present process. These steps may be biological or chemical, or physical. The biological steps consist in propagating in the slop a growth of fungi for the purpose of binding or eliminating certain easily soluble impurities, and the fungi can be afterward separated from the slop. A further and important purpose of the growth of fungi in the slop may be to increase the absolute amount of by-products in the same, for instance, doing so very effectively by a lactic acid fermentation. By adding a small amount of carbohydrates to the slop and then subjecting the slop to said lactic acid fermentation a larger yield of lactic acid may be obtained with but a small increase in the cost of production. The addition of a small amount of carbohydrates to the slop is also favorable if other fungi than lactic acid bacteria are propagated in the slop.

The chemical steps consist in adding acids to the slop in order to liberate the weaker organic acids present in the slop in the shape of salts. These steps may also consist in neutralizing the slop before concentrating the same and acidifying it after concentration, for instance, in order to avoid corrosion of the metallic parts of the concentrating apparatus.

In order to facilitate concentrating or drying, and in order to localize the biological or chemical process to the soluble part of the slop I preferably separate the slop into a solid part and into a liquid part and treat the liquid part only, or both separately. Or, I can also concentrate the liquid part separately by evaporating it in vacuum and mix the resulting concentrated liquid part with the solid part of the slop and treat the mixture with the solvent before or after drying the mixture. If the liquid part of slop is treated separately with the solvent I preferably incorporate the residue of extraction with the solid part of slop and dry the mixture.

The liquid part of the slop may also be mixed before or after concentrating with absorbent material and I preferably use such absorbent materials as do not reduce the value of the residue as a commercial cattle-feed. The admixture of absorbent material may be done in order to facilitate drying and in order, also, to make the slop more accessible to the solvent. While I may use biological and chemical steps in preparing the slop for the extraction I can also use physical steps only but preferably I proceed in the following way in order to prepare the slop for the extraction. First, I separate the slop into a solid part and into a liquid part, then the acidity of the liquid part is increased by subjecting it to a lactic acid fermentation. This soured liquid part is afterward concentrated in vacuum to the consistency of a syrup and this syrup is now mixed with the solid part of slop and the mixture dried.

It is not necessary to absolutely dry the slop for carrying out the process since its great bulk may be reduced by removing the largest part of the water therefrom or reduced to the syrupy consistency described. But I prefer to dry it because the contact of the fat-solvents with the slop can be better effected when the slop is treated in a dry state and I can use the total slop or parts of this slop which may have been separated from the total slop by physical or chemical means.

In the claims wherever the term "slop" is used instead of "the slop" I mean either the total slop, or part of the slop, or any slop which has undergone some preparatory treatment before the extraction of the by-products.

The next step of my process is to bring together the properly prepared slop with the solvent. Various methods may be used for effecting this. It is found to be most convenient and preferable to place the dried slop in an apparatus similar to that used for the extraction of fat, and the solvent is caused to pass continuously through the said slop the resulting solution being continuously drawn off and continuously concentrated, the vapor arising from the boiling solution being condensed and passed through the slop, again condensed and again passed through and repeated until the slop is exhausted of its by-products. This operation can further be made a continuous one by continuously bringing the dried slop and the solvent together and continuously separating the solution from the residue.

The solvent treatment may take place at any temperature desired at any ordinary atmospheric pressure or even at higher or lower pressures. Higher temperature and pressure increase the speed of extraction but decrease the purity of the products. The solvent solution so obtained is concentrated by evaporating the solvent completely or partially therefrom and the further treatment consists in separating the resulting mixture of by-products into components. The solvents are recovered from the final residue preferably by heating said residue, for instance, by blowing a current of steam through the same.

The solution obtained by this process contains lactic acid and succinic acid and fat if the slop contains the latter. If it contains no fat, which is an exception, then, of course, I obtain the lactic and succinic acids and no fat. The fat is best separated from the mixture by evaporating the solvent until said fat is liberated. Now the fat can be readily and easily separated from the other products by reason of its difference in specific gravity from said other products since it does not mix with the other products in the absence of a common solvent but rises to the surface and can be drawn off. The remaining solution containing the lactic and succinic acids may be, of course, one of the final products of the process or said solution can be further separated into its components. This separation can be brought about either by chemical or physical means, the latter including distillation. The chemical or physical means, with the exception of distillation employed for the separation of the lactic from the succinic acid, have a common purpose that of making one of the components soluble while the other remains insoluble whereby a separation can be readily effected.

An easy separation of the succinic acid from the lactic acid, although an incomplete one, can be obtained by allowing the concentrated mixture of lactic and succinic acid to stand until the latter crystallizes. The crystals can then be readily separated from the remaining liquid. Or, again, the mixture containing the lactic and succinic acids can be separated by first neutralizing the acids and then separating the salts from each other by treating the mixture with solvents which dissolve the salts of one acid but not those of the other. The acids are later liberated from their salts with stronger acids. The lactic and succinic acids can also be separated from each other by distillation since the lactic acid has a much lower boiling point than the succinic acid and will pass off leaving the latter. But believing that I am the first to recover lactic and succinic acids from distillery-slop by treating the slop with a fat-solvent I do not confine myself to any one of the special methods enumerated for the separation of these substances from the solution obtained by the fat-solvent treatment.

Thus far I have not stated that the solvent is recovered from the solution but it is to be stated that wherever either in the specification or claims the recovery of a solvent is not expressly mentioned, it is understood that this recovery takes place, for economical reasons particularly, and I can use for their recovery any style of distilling or rectifying apparatus.

The following is an example of the manner in which my process is carried out in practice:—30,000 gallons of slop which represents the amount derived from the fermentation of 1000 bushels of grain are, preferably directly after leaving the distilling apparatus, separated by the aid of filter-presses, for example into two parts, a solid and a liquid. The liquid part is placed in a tub and to it is added 500 gallons of a culture of lactic acid bacteria prepared for instance, by adding a pure-culture of lactic acid bacteria to a wort, obtained by filtering a corn-mash made in the usual way from 20 bushels of corn and 2 bushels of malt. This addition of 500 gallons culture of lactic acid bacteria starts the lactic acid fermentation in the liquid and also imparts to it as a natural consequence a small amount of carbohydrates. Instead of adding a culture in this shape the culture of lactic bacteria may also be represented by 500 gallons of thin slop which has been inoculated with said lactic bacteria. The lactic acid fermentation in the bulk of the liquid slop can be also a spontaneous one that is to say it may start therein by the presence of bacteria in the unclean vessel in which the slop is placed or from the air or even by other similar ways. But it is to be preferred, as in all biological processes, to start the fermentation with a pure seed of lactic bacteria and this addition to the liquid part of the slop takes place when the latter is cooled to about 125° Fahrenheit, this temperature being maintained in order to insure the production of a pure acid. After 24 to 48 hours of fermentation the soured thin slop is concentrated in a multiple-effect vacuum-evaporator to the consistency of a syrup and this is now mixed with filter-cakes obtained from the slop. In practice, where the distillery operations are carried on daily, the filter-cakes, which answer the same as the solid part of the slop, are mixed with the syrup filtered one or two days prior during which time the liquid part has been soured and concentrated. This method of souring admits of localizing the biological process to the substances dissolved in the slop, the acid being obtained without the action of the bacteria on the real protein-substances which being insoluble remain in the cake or solid part of the slop. The cakes are thoroughly mixed with the sour syrup and the mixture dried on any suitable drying apparatus, for instance, a rotary drier and it is preferable to do the drying at a low temperature. The cake can also be dried if desired before mixing it with the syrup and the mixture may be again dried. The product resulting from drying this mixture differs from ordinary dried slop inasmuch as it contains a large amount of lactic acid. This dried slop is now ground and placed in an apparatus of similar construction to that used for the extraction of fat. The essential parts of such an apparatus which, however, form no part of my invention, are a vessel with a perforated false bottom in which the dried slop is placed, a still in which the solvent solution is to be boiled, and a reflux cooler to condense the vapor coming from this still and return it to the dried slop through which it percolates. The still is provided with a steam-coil which keeps the solution boiling, the said apparatus also including the necessary receiving tanks for the solvent and for the resulting solutions.

In the still is placed ethyl-ether to the amount of substantially twice the volume of that of the dried slop placed in the percolating vessel. The ether is caused to boil and its vapor ascends to the reflux-cooler, percolates through the dried slop and returns to the still. This operation is kept on continuously until the slop is practically exhausted of organic acids, which can be easily determined by testing the acidity of a small amount of the ether by the usual chemical means as it comes from the percolating vessel. When the proper stage is reached the operation is interrupted and the solution contained in the still is withdrawn preferably after evaporating the solvent from the solution. It contains fat, lactic and succinic acids in a state of high purity and the treatment of said solution will be explained later.

By evaporating the solvent the fat is liberated and arises, after some time, to the top and forms a separate layer which is drawn off separately and the resulting mixture of lactic and succinic acids may be one of the final products of this process, or may be further separated into components, as already stated, but if boiled down far enough and allowed to stand at low temperature the largest part of the succinic acid crystallizes and can be readily separated from the remaining solution. The mixture of lactic and succinic acids may also be neutralized for instance with lime or carbonate of lime and the neutralized mixture treated with solvents, for instance with water. The water dissolves the lactates much easier than the succinates and in this way a separation can be effected, and the acids can be afterward liberated from their salts by stronger acids.

In certain of the claims I shall use the terms "removing water from the slop" and "drying slop". In explanation of the use of these terms I wish to say that in the meaning of the first the bulk of the water may be removed without absolutely drying the material, whereas in the use of the second term the treatment may go as far as drying the material completely. As already intimated herein treatment with the extracting agents may be done in either condition although the extraction from dry material is more readily accomplished.

Having described my invention, I claim:—

1. In the process of recovering a plurality of by-products from distillery-slop with the aid of solvents, the process which consists in removing water from slop, treating said slop with a fat-solvent capable of dissolving lactic acid and succinic acid and which has a tendency to repel glycerin and separating the solution resulting from this treatment from the insoluble part.

2. In the process of recovering a plurality of by-products from distillery-slop with the aid of solvents the process which consists in drying slop, treating the dried slop with a fat-solvent capable of dissolving lactic acid and succinic acid and which has a tendency to repel glycerin, and separating the solution resulting from this treatment from the insoluble part.

3. The process of recovering lactic acid, and succinic acid from a mixture of substances derived from distillery slop consisting in treating said mixture wtih a fat-solvent capable of dissolving the named acids and having a tendency to repel glycerin, and separating the solution resulting from this treatment from the insoluble part.

4. In the process of recovering a plurality of by-products from distillery-slop, the process which consists in acidifying slop, removing water from slop, treating said slop with a fat-solvent capable of dissolving lactic and succinic acids and which has a tendency to repel glycerin, and separating the solution resulting from this treatment from the insoluble part.

5. The process of recovering from distillery-slop a solution containing fat, lactic and succinic acids, and a dry residue, consisting in separating slop into a solid part and a liquid part, removing water from the liquid part, treating the liquid part with a fat-solvent capable of dissolving lactic and succinic acids and which has a tendency to repel glycerin, and separating the solution resulting from this treatment from the insoluble part.

6. In the process of recovering a plurality of by-products from distillery-slop, the process which consists in first separating a mixture of substances derived from distillery-slop into a solution of by-products and into a residue by treating the same with a fat-solvent capable of dissolving lactic and succinic acids and which has a tendency to repel glycerin, recovering the solvent from said solution thereby liberating the fat, and separating the fat from the remaining mixture of by-products.

7. In the process of recovering lactic and succinic acids, and fat from distillery-slop, the process which consists in first separating a mixture of substances derived from distillery-slop into a solution of by-products and into a residue by treating the same with a fat-solvent capable of dissolving lactic and succinic acids and which has a tendency to repel glycerin, and afterward separating from said solution a part of the by-products by crystallization.

8. In the process of recovering lactic and succinic acids, and fat from distillery-slop, the process which consists in first separating a mixture of substances derived from distillery-slop into a solution of by-products and into a residue by treating the same with a fat-solvent capable of dissolving lactic and succinic acids and which has a tendency to repel glycerin, recovering the solvent from the solution and afterward separating from the resulting mixture a part of the by-products by crystallization.

In testimony whereof I affix my signature, in presence of two witnesses.

ALADÁR von LASZLOFEY.

Witnesses:
EUNICE M. BECKUM,
L. M. THURLOW.